E. A. CRANDALL.
Measuring Distances.

No. 15,602. Patented April 26, 1856.

UNITED STATES PATENT OFFICE.

ENOCH A. CRANDALL, OF FRIENDSHIP, NEW YORK.

INSTRUMENT FOR MEASURING DISTANCES FROM A SINGLE STATION.

Specification of Letters Patent No. 15,602, dated August 26, 1856.

*To all whom it may concern:*

Be it known that I, ENOCH A. CRANDALL, of Friendship, in the county of Allegany and State of New York, have invented a new and useful Instrument for Measuring Distances and Altitudes; and I do hereby declare that the following is a full, clear, and exact description of the same, reference being had to the accompanying drawings, forming part of this specification, in which—

Figure 1:
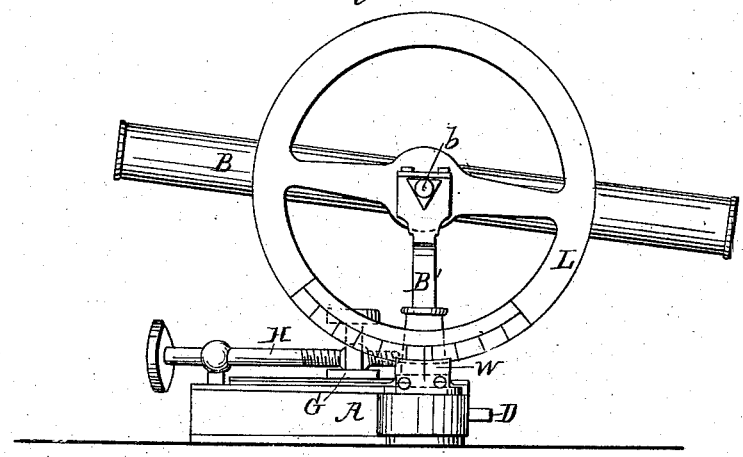
Figure 2:
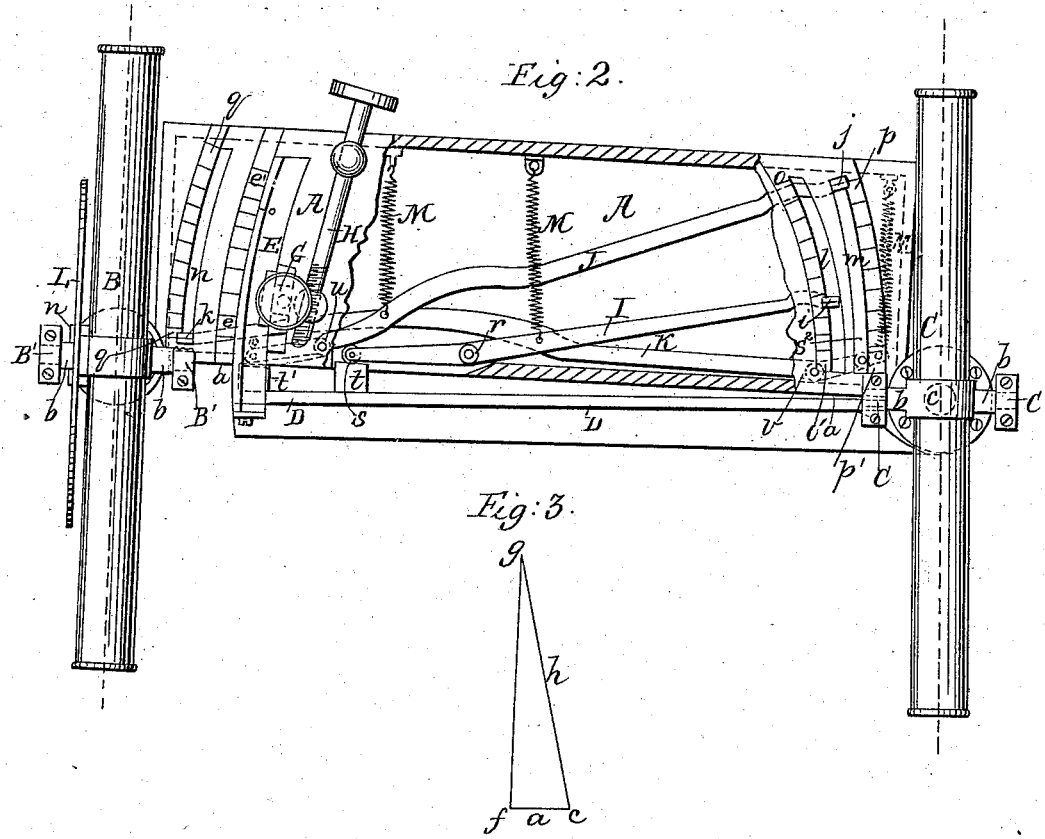
Figure 3:
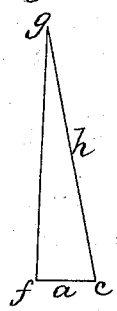

Figure 1, is a side view of the instrument. Fig. 2, is a plan of the same, with a portion of the top plate of the hollow base broken away to show the interior. Fig. 3, is a diagram to illustrate the principle of operation of the instrument.

Similar letters of reference indicate corresponding parts in Figs. 1 and 2.

The instrument consists of two telescopes, sight tubes, or other sighting devices, placed at a certain fixed distance apart on a suitable table or base; one of said telescopes or sighting devices being stationary relatively to the table or base, and the other being movable on a fixed pivot in a line that forms a right angle with the stationary one as to be capable of being brought to bear upon the same point or object. The movable telescope or sighting device has attached to it an index moving over a graduated scale of distances on the table or base, by which, when brought to bear on the same point or object as the stationary one, it indicates on the said scale the distance of the said point or object from the point of observation. The operation of the instrument is based upon the well known principle in trigonometry that when the length of the base of a right-angled triangle is given, the adjacent angle formed by the hypotenuse serves to determine the length of the perpendicular.

To enable others skilled in the art to make and use my invention, I will proceed to describe its construction and operation, with reference to the drawings.

A, represents a horizontal box, forming the table or base of the instrument. B, represents a sighting tube placed on a stand, $B^1$, at one corner of the said box and fixed at a right angle to the front side, $a$, thereof, which forms a right line, but arranged to be capable of a vertical movement on trunnions, $b$, $b$, fitted to bearings in the stand, $B^1$.

C, represents a movable sighting tube arranged in a stand, $C^1$, to turn horizontally on a pivot, $c$, in the base, A; said pivot being indicated by a dotted circle in Fig. 2. The center of this pivot, $c$, intersects the right line, $a$, forming the edge of the front side of the base, A. The tube C, like the tube B, is arranged to move vertically on trunnions, $b$, $b$. Both tubes should stand at the same elevation and when the two are parallel, the axes of their trunnions should stand in line.

D, is a horizontal index bar, carrying an index, E, and attached to the stand, $C^1$, of the tube, C, in front of the base, A, in such a manner that when the said tube is parallel with the tube, B, the said index bar will be close up to the front side, $a$, of the base. A point on the index, E, works on a graduated scale of distances, $e$, $e^1$, on the face of the top plate of the base of the instrument. The index, E, is furnished with a screw clamp, G, by which it is attached at pleasure to a screw, H, by turning which the tube, C, is moved and adjusted with accuracy in any position. The base of the instrument is to be furnished with a compass and spirit levels like other surveying instruments, but as the use of these is well understood I have not considered it necessary to show them to explain my invention. A tripod or other suitable stand is also necessary to support the instrument when in operation.

In connection with the index bar, D, and its index, E, I use a system of multiplying levers and scales to multiply the scale of distances, but the principle of operation can be illustrated more readily without reference to these devices and the explanation of said devices will be easier after having illustrated the principle of operation of the instrument. I will reserve the said explanation till after I have illustrated the said principle of operation.

Let it be supposed that the distance from $f$, to $g$, Fig. 3, is to be measured. A staff is placed at the point, $g$, unless there be some object already stationary at that point to be used as a sight point. The instrument is placed with the point where the line, $a$, of the front side of the base meets the vertical plane in which is the axis of the tube, B, vertically above the point $f$, and with the tube, B, parallel to the line, $f$, $g$; and the tube, B, is sighted to the point, $g$. The line $a$, of the instrument then forms a base to which the line $f$, $g$, is perpendicular. The tube, C, is then moved on its pivot, $c$, at the end of the line, $a$, till it also sights the point, $f$, and the angle that is formed with the line, $a$, by the line, $h$, running from $c$ to $g$, and forming the hypotenuse of the triangle $f$, $c$, $g$, determines the length of the perpendicular $f$, $g$. The index, E, moves with the tube, C, and the scale, $e$, $e^1$, being graduated in distances corresponding to the angle at $c$, the true distance from $f$ to $g$ is indicated by the index on the scale, $e$, $e^1$.

In measuring long distances the tube, C, comes nearly parallel with the tube, B, and as it approaches to a state of parallelism the tube, C, will take a long range along the line $f$. $g$, without producing a movement of the index, E, that is very perceptible to the eye. This renders it impossible that the scale, $e$, $e^1$, the width of whose graduations diminishes progressively from the commencement, $e$, can be graduated up to a termination at the end, $e^1$, with as great a degree of fineness as is desirable for accurate measurement. It is with a view to remedy this deficiency that I have added to the instrument the multiplying levers and scales which I have already mentioned and will now proceed to describe. The multiplying levers, I, J, K, of which I have shown three, but of which there may be any other number, are all arranged to work within the box or hollow base, A, so as to be out of the way of the surveyor, but are furnished respectively with indices, $i$, $j$, $k$, working through slots, $l$, $m$, $n$, in the top plate of the base, A over graduated scales, $o$, $o^1$, $p$, $p^1$, $q$, $q^1$, on the upper surface of said plate. The lever, I, which is the first of the series is a lever of the first order, working on a fulcrum, $r$, and having a very long and a very short arm; the index, $i$, being attached to the long arm and the short arm, being fitted with a roller, S, or made of rounded form, and so placed relatively to the bar, D, that when the index, E, has moved as far up the scale, $e$, $e^1$, as it will indicate accurately, a projection, $t$, on the said bar comes in contact with the roller, S, or end of the lever, I, and, by a continuous movement of the bar toward the line, $a$, the lever, I, is put in motion and the index, $i$, is caused to move over the scale, $o$, $o^1$, which being graduated to suit the movement of the said index bears such a proportion to the index, $e$, $e^1$, as the long arm of the lever bears to the short arm. The lever, J, carrying the index, $j$, working over the scale, $p$, $p^1$, is placed on a fulcrum, $u$, and is in all respects like the lever, I, but that it is longer and has its long arm carrying the index so proportioned to the short arm as to multiply the movement of its index, $j$, more than that of the index, $i$. It is operated upon by a projection, $t^1$, on the index bar, D, but is not operated upon till the index, $i$, approaches near to the end, $o^1$, of its scale where the divisions of the said scale become very minute. The lever, K, carrying the index, $k$, works over the scale, $q$, $q^1$, on a fulcrum, $v$, and is like the other levers, but has its index near the opposite end of the base, A. It derives its motion from the lever, J, at a point near the index, $j$; the said lever, J, as its index arrives near the end, $p^1$, of the scale, comes in contact with a roller, S², on the short arm of the lever, K, or with a rounded portion thereof. The levers I, J, K, have severally applied to them springs, M, M, to throw their indices back to the commencement of their respective scales when the bar, D, is moved away from the edge, $a$, of the base, A.

By an arrangement of multiplying levers and scales such as I have described the sufficient motion of an index may be obtained to show the movement of the telescope, C, to such a point in the line of sight of the telescope, B, as may be desirable. The three levers, I, J, K, proportioned as shown in the drawing, multiply the scale one hundred times. To multiply the scale the same number of times with the indices all in operation the whole time, as in multiplying indicating apparatus attached to other instruments, would require so much room as to be almost impracticable; but by arranging the indices to come successively into operation, each as the graduations of the scale of its predecessor become too small to be easily distinguishable, the multiplication is not effected till it becomes requisite and the separate indices are caused to require only a short range.

I attach to the telescope, B, a circle, L, described from the axis of the trunnions, $b$, and graduated on a part of its circumference in degrees, and provide a stationary index, $u$, for the degrees of the circle, so that the altitude of any object in degrees can be ascertained. By proper printed tables to accompany every instrument, when the altitude of an object and its distance from the point of observation are obtained, its true height may be readily found.

What I claim as my invention, and desire to secure by Letters Patent, is—

The combination of the stationary telescope B the movable telescope C with its index bar D and index E and the multiplying levers I J K with their indexes $i$, $j$, $k$, and springs M and their respective scales $e$ $e'$, $o$ $o'$, $p$ $p'$, and $q$ $q'$, all arranged as hereinbefore described and for the purposes set forth.

ENOCH A. CRANDALL.

Witnesses:
WM. TUSCHE,
JAMES F. BUCKLEY.